(12) United States Patent
Mutschler et al.

(10) Patent No.: US 10,378,071 B2
(45) Date of Patent: Aug. 13, 2019

(54) BELLOW COMPENSATOR

(71) Applicant: Paul Wurth S.A., Luxembourg (LU)

(72) Inventors: Klaus Mutschler, Sarrebourg (DE); Paul Tockert, Berbourg (LU); Jean-Paul Closener, Olm (LU); Christian De Gruiter, Fentange (LU); Nicolas Schlesser, Saint-Avold (FR)

(73) Assignee: PAUL WURTH S.A., Luxembourg (LU)

( * ) Notice: Subject to any disclaimer, the term of this patent is extended or adjusted under 35 U.S.C. 154(b) by 0 days.

(21) Appl. No.: 15/741,964

(22) PCT Filed: Jul. 6, 2016

(86) PCT No.: PCT/EP2016/066027
§ 371 (c)(1),
(2) Date: Jan. 4, 2018

(87) PCT Pub. No.: WO2017/005811
PCT Pub. Date: Jan. 12, 2017

(65) Prior Publication Data
US 2018/0195139 A1    Jul. 12, 2018

(30) Foreign Application Priority Data

Jul. 9, 2015 (LU) .......................... 92 766

(51) Int. Cl.
*F27D 3/10* (2006.01)
*C21B 7/20* (2006.01)
(Continued)

(52) U.S. Cl.
CPC ............... *C21B 7/20* (2013.01); *F16L 27/111* (2013.01); *F16L 51/025* (2013.01);
(Continued)

(58) Field of Classification Search
CPC .................................... C21B 7/20; F27B 1/20
See application file for complete search history.

(56) References Cited

U.S. PATENT DOCUMENTS

| 4,023,782 A * | 5/1977 | Eifer ....................... F16L 51/02 |
| | | 266/186 |
| 4,442,585 A * | 4/1984 | McGehee, Sr. ........ F16L 59/026 |
| | | 138/149 |
| 2018/0195139 A1 * | 7/2018 | Mutschler ................ C21B 7/20 |

FOREIGN PATENT DOCUMENTS

| DE | 29617552 U1 | 2/1998 |
| DE | 102007004766 A1 | 8/2008 |

(Continued)

OTHER PUBLICATIONS

KR Office Action dated May 9, 2018 re: Application No. 10-2018-7002105, pp. 1-18, citing: EP0848143, EP2302275, EP1055807.
(Continued)

*Primary Examiner* — Scott R Kastler
(74) *Attorney, Agent, or Firm* — Cantor Colburn LLP

(57) ABSTRACT

The invention relates to a bellow compensator for a charging installation of a metallurgical furnace. The bellow compensator comprises an inlet end pipe 40 and an opposite outlet end pipe 42 and a bellow section 44 arranged between the inlet end pipe 40 and the outlet end pipe 42, the bellow section 44 being formed by a series of folds and allowing relative movement between the inlet end pipe 40 and the outlet end pipe 42. According to the present invention, a non-structural flexible liner 60, preferably wire mesh gasket, is arranged along an inner wall 62 of the bellow compensator and extends over at least some of the length of the bellow section 44. The non-structural flexible liner 60 has a first end 64 and a second end 66, wherein the first end 64 is fixedly
(Continued)

connected to the inlet end pipe 40 and the second end 66 is fixedly connected to the outlet end pipe 42.

9 Claims, 5 Drawing Sheets

(51) Int. Cl.
  *F16L 27/111* (2006.01)
  *F27B 1/20* (2006.01)
  *F16L 51/02* (2006.01)
(52) U.S. Cl.
  CPC .............. *F16L 51/026* (2013.01); *F27B 1/20* (2013.01); *F27D 3/10* (2013.01)

(56) References Cited

FOREIGN PATENT DOCUMENTS

| EP | 0848143 | A1 | 6/1998 |
|----|---------|----|--------|
| EP | 1055807 | A2 | 11/2000 |
| EP | 2302275 | A1 | 3/2011 |
| GB | 1038431 | A | 8/1966 |
| GB | 2065550 | A | 7/1981 |
| JP | S56127875 | A | 10/1981 |
| JP | 09268913 | A | 10/1997 |

OTHER PUBLICATIONS

International Preliminary Report on Patentability dated Oct. 25, 2017 re: Application No. PCT/EP2016/066027; pp. 1-14; citing: GB 1 038 431 A, JP H09 268913 A, DE 296 17 552 U1 and DE 10 2007 004766 A1.

International Search Report dated Oct. 19, 2016 re: Application No. PCT/EP2016/066027; pp. 1-4; citing: GB 1 038 431 A, JP H09 268913 A, DE 296 17 552 U1 and DE 10 2007 004766 A1.

Written Opinion dated Oct. 19, 2016 re: Application No. PCT/EP2016/066027; pp. 1-5; citing: GB 1 038 431 A, JP H09 268913 A, DE 296 17 552 U1 and DE 10 2007 004766 A1.

JP Office Action dated Jul. 17, 2018 re: Application No. P2018-500483, pp. 1-9, citing: GB1038431A, JP S56-127875A and JP H09-268913A.

\* cited by examiner

- PRIOR ART -

- PRIOR ART -

BELLOW COMPENSATOR

TECHNICAL FIELD

The present invention generally relates to a bellow compensator for a charging installation of a metallurgical furnace.

BACKGROUND ART

Bell less top charging installations have found widespread use in blast furnaces around the world. They commonly comprise a rotary distribution device equipped with a distribution chute which is rotatable about the vertical central axis of the furnace and pivotable about a horizontal axis perpendicular to the central axis. In multiple hopper installations, two or more material hoppers are arranged in parallel; each provided with their own inlet and outlet gates. While material is fed from one hopper into the metallurgical furnace, another hopper can be simultaneously filled with material. In order to ensure that the correct amount of material is fed into the metallurgical furnace, each material hopper comprises a weighing system for determining the weight of the material hopper and its content. Such weighing systems require a relative movement between the material hopper and the metallurgical furnace. Bellow arrangements, which are also often referred to as compensators, are generally used to compensate for such relative movement. While reference is here made to the use of bellow arrangements in connection with a charging installation of the parallel hopper type, the same are used in other types of charging installations, such as e.g. the central feed type. Also, bellow arrangements can be arranged in ducts, such as e.g. pressure relief duct.

Such compensators form a pipe with a bellow section formed by a series of folds which provide some flexibility between the inlet and outlet ends of the pipe. The folds form pockets, which are required for achieving this flexibility. The inner pockets of the bellow section are exposed to the material passing through the pipe. Any material or dust accumulation in these pockets reduces their size and thus the flexibility of the bellow section. Eventually, once sufficient material or dust has accumulated in the pockets, the bellow section is said to be clogged and is no longer able to fulfill its full function. Clogged compensators prevent the weighing system from working correctly as the relative movement between material hopper and metallurgical furnace is no longer guaranteed. Correct determination of amount of material fed into the metallurgical furnace is however essential for the correct functioning of the latter. Thus, it is important to prevent clogging of the compensators.

It has in the past been suggested to arrange a protection plate inside the compensator for directing material past the pockets. Such a protection plate may e.g. be welded to the inlet end of the pipe, i.e. above the bellow section, and run past the bellow section to a region below the bellow section. In order to allow relative movement between the inlet and outlet ends of the pipe, the protection plate cannot be welded to the outlet end of the pipe. Such a protection plate allows for material to be guided past the bellow section and reduces material accumulation in the pockets. Furthermore, an annular gasket may be arranged at the outlet end of the pipe between the protection plate and the pipe. Due to the annular gasket having to cope with relative movement between the protection plate and the pipe and due to the high pressures reigning in the pipe, such a gasket cannot completely prevent dust from penetrating into the region between the protection plate and the bellow section. Thus, dust can still accumulate in the pockets of the bellow section and, with time, prevent the correct functioning of the compensator.

BRIEF SUMMARY

The invention provides a bellow compensator capable of reducing or eliminating dust accumulation in the bellow section.

The invention provides a bellow compensator for a charging installation of a metallurgical furnace. The bellow compensator comprises an inlet end pipe and an opposite outlet end pipe and a bellow section arranged between the inlet end pipe and the outlet end pipe, the bellow section being formed by a series of folds and allowing relative movement between the inlet end pipe and the outlet end pipe. According to the present invention, a non-structural flexible liner is arranged along an inner wall of the bellow compensator and extends over at least some of the length of the bellow section. The non-structural flexible liner has a first end and a second end, wherein the first end is fixedly connected to the inlet end pipe and the second end is fixedly connected to the outlet end pipe. By "non-structural", we understand that the flexible liner is not adapted to support weight.

Such a non-structural flexible liner covers at least some of the length of the bellow section of the compensator and bridges the gap between the inlet end pipe and the outlet end pipe, thereby ensuring that material fed through the compensator is fed past the pockets of the bellow section. As the non-structural flexible liner is fixedly connected to the compensator between the inlet end pipe and the outlet end pipe, no material or dust can penetrate into the space between the flexible liner and the bellow section. Thus, no material or dust can settle in the pockets of the bellow section. The correct functioning of the compensator is thus maintained. The connection of the liner to both the inlet end pipe and the outlet end pipe is possible because the liner itself is also flexible. By using such a flexible liner, the rigid protection plate used in prior art devices is no longer required.

The non-structural flexible liner is dustproof in order to avoid dust passing therethrough and reaching the pockets of the bellow section. The non-structural flexible liner is itself either made from a dustproof material or comprises a dustproof coating.

Preferably, the non-structural flexible liner is formed by a flexible material, reinforced or not. Most preferably, the flexible liner is formed by a wire mesh gasket.

The non-structural flexible liner may comprise one or more materials chosen within the group comprising silicon, Kevlar®, Viton®, Twaron® or a combination thereof. The non-structural flexible liner may e.g. comprise at least one layer made from synthetic fiber, preferably para-aramid synthetic fiber. Para-aramid fibers are preferred because of their heat-resistance and their high tenacity and elastic modulus properties. The non-structural flexible liner may thus comprise one or more layers of materials such as Kevlar® or Twaron®. The flexible liner may further comprise at least one layer made from silicone.

A wire mesh gasket comprising three layers of silicone and three layers of Kevlar® may tolerate pressures up to 3 bar and temperatures of up to 200° C.—momentarily even up to 400° C. Such wire mesh gaskets would be resistant up to 20 pressure relieves per hour, each being associated with a pressure difference of up to 3 bar.

Advantageously, the first end of the non-structural flexible liner is fixedly connected to the inlet end pipe and the second end of the non-structural flexible liner is fixedly connected to the outlet end pipe. The connection e.g. may be by means of welding, bolts, clamps or glue. In any case, the connection will be such that a gas tight and dust tight connection of the non-structural flexible liner to the compensator is guaranteed.

Preferably, the non-structural flexible liner is supported by inner-facing folds of the bellow section. Thus, the inner-facing folds, or convolutions, of the bellow section provide further support for the non-structural flexible liner.

Alternatively, the non-structural flexible liner is supported by a supporting plate arranged between the non-structural flexible liner and the folds of the bellow section. Such a supporting plate may extend over some or all of the height of the bellow section.

The inlet end pipe and/or the outlet end pipe may comprise an extension extending in direction of the opposite end pipe, thereby reducing the gap between the inlet end pipe and the outlet end pipe. The gap reduction allows the use of a non-structural flexible liner of shorter length because the gap to be bridged in order to protect the bellow section is shorter. The extension may also provide a larger connection area for fixing the non-structural flexible liner thereto. Such a larger connection area may facilitate connecting the flexible liner to the inlet end pipe and/or the outlet end pipe.

BRIEF DESCRIPTION OF THE DRAWINGS

Preferred embodiments of the invention will now be described, by way of example, with reference to the accompanying drawings, in which.

DESCRIPTION OF PREFERRED EMBODIMENTS

Figure 1:
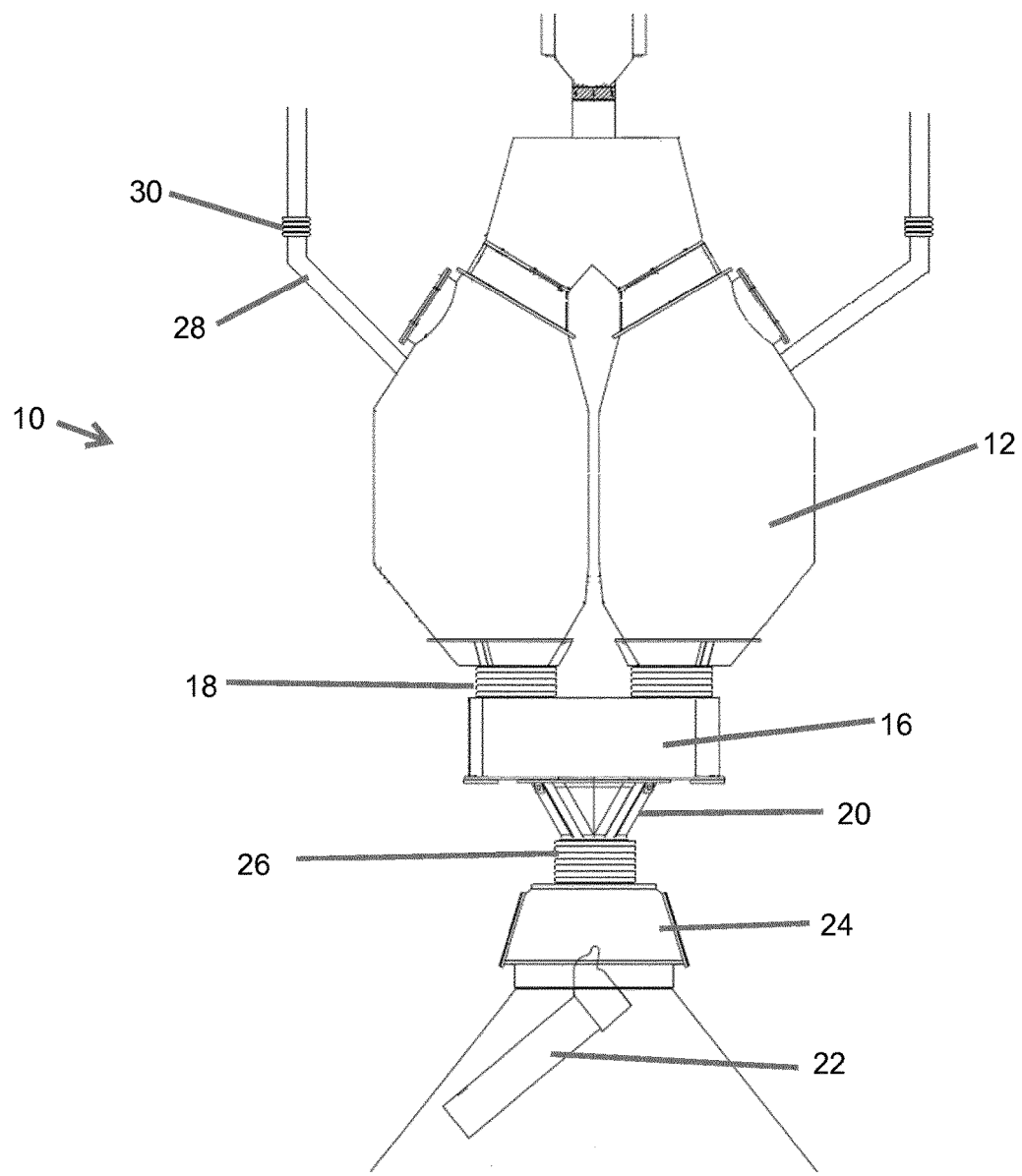
FIG. 1 is a cross-sectional view through a portion of a charging installation of a metallurgical furnace according to the known prior art.

FIG. 1 shows a portion of the charging installation of a metallurgical furnace, the charging installation being of the Bell Less Top® type with parallel hoppers and the metallurgical furnace being a blast furnace. The charging installation shown in FIG. 1 is of the parallel hopper type. Other charging installations, such as e.g. of the central feed type, are also covered by the present invention.

The portion of the charging installation 10 represented in FIG. 1 comprises two material hoppers 12. Two seal valves (not shown) are arranged downstream of the material gates in a valve casing 16 for forming a gastight closure between the material hoppers and the blast furnace. Bellow compensators 18 (also referred to as upper bellow compensators) are arranged between the material hoppers 12 and the valve casing 16. The bellow compensators 18, provide the necessary flexibility for allowing the material hoppers to move relative to the blast furnace. This flexibility is necessary for the correct functioning of the weighing system (not shown) used to determine the amount of material in a material hopper and thus the amount of material fed into the blast furnace. A discharge funnel 20 is arranged downstream of the valve casing 16, for collecting material from the different material hoppers 12, and feeding the material via a single feeder spout (not shown) onto a distribution chute 22 through a distribution chute gearbox 24. A bellow compensator 26 (also referred to as lower bellow compensator) is generally arranged between the discharge funnel 20 and the distribution chute gearbox 24.

While FIG. 1 shows an arrangement for an installation with two material hoppers, the above is true also for installations with three or more material hoppers. As mentioned above, installation of the central feed type may also be envisaged.

FIG. 1 also shows pressure relief ducts 28 connected to the material hoppers 12. Bellow compensators 30 may also be arranged in such pressure relief ducts 28.

Figure 2:
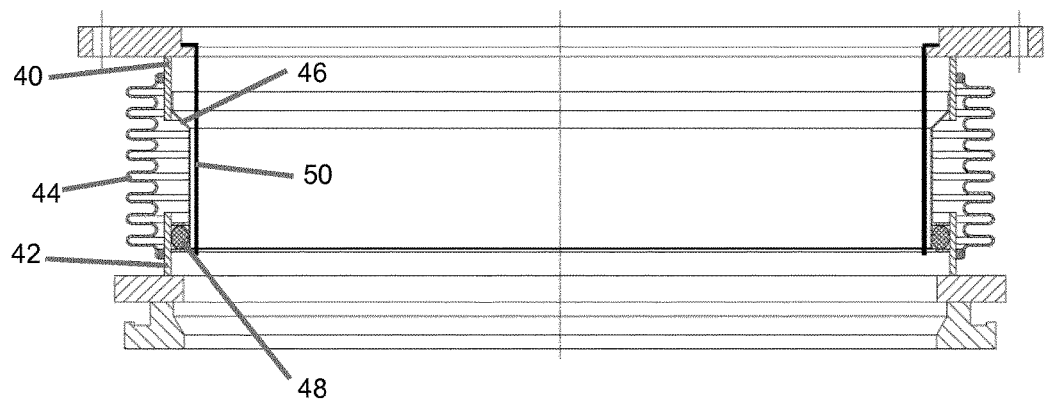
FIG. 2 is an enlarged cross-sectional view through a bellow compensator of FIG. 1.

FIG. 2 shows an enlarged view of the lower bellow compensator 26 according to the known prior art. Such a compensator generally comprises an inlet end pipe 40 and an opposite outlet end pipe 42 and a bellow section 44 arranged therebetween. The bellow section 44 is formed by a series of folds allowing relative movement between the inlet and outlet end pipes 40, 42. Traditionally, in order to prevent material and dust accumulation in the folds of the bellow section 44, a protection plate 46 is fixedly connected to the inlet end pipe 40 and runs along the bellow section 44 down to the outlet end pipe 42. An annular gasket 48 is arranged between the protection plate 46 and the outlet end pipe 42 to prevent material and dust from entering the space between the bellow section 44 and the protection plate 46. Furthermore, a wear insert 50 attached to a funnel portion (not shown) arranged upstream of the bellow compensator 26 may extend into the bellow compensator 26 and provide a further element guiding the vast majority of the material past the bellow section 44. It has been noted however that even with these protection features, dust still accumulates in the pockets of the bellow sections and between different parts with relative movement. Not only dust accumulation in the pockets of the bellow sections, but also between two surfaces where relative movement should be allowed, can hinder the flexibility of the compensator and must therefore be avoided.

Figure 3:
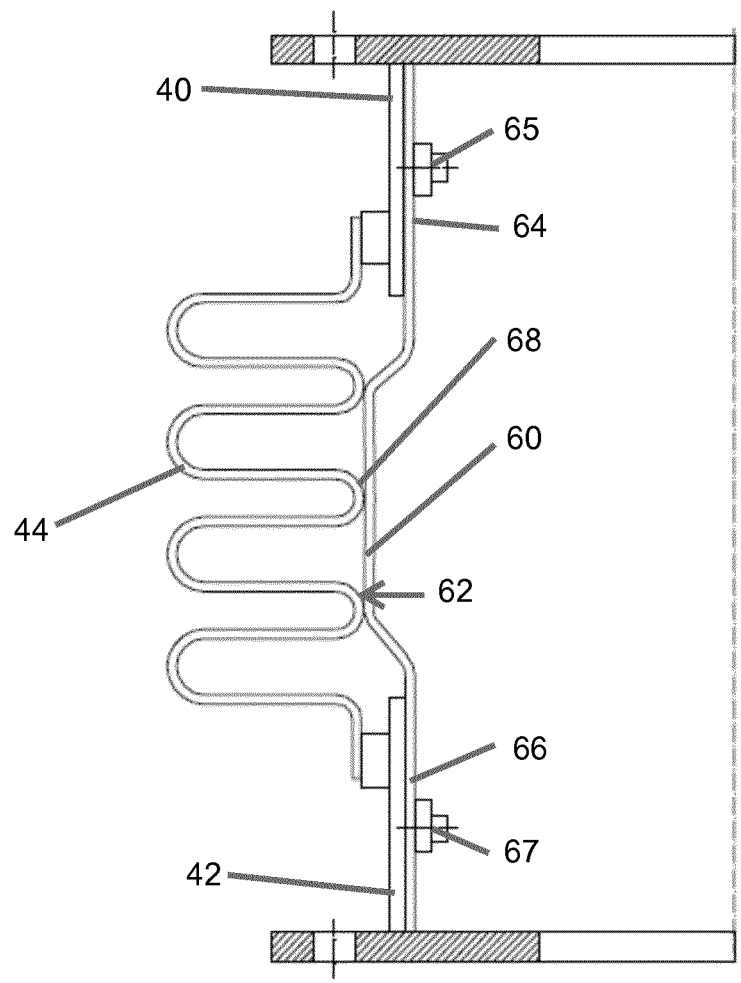
FIG. 3 is a cross-sectional view through a portion of a bellow compensator according to a first embodiment of the present invention.

A portion of a bellow compensator according to a first embodiment of the present invention is shown in FIG. 3. Such a bellow compensator comprises an inlet end pipe 40 and an opposite outlet end pipe 42 and a bellow section 44 arranged therebetween. The end pipes 40 respectively 42 are located at the end of one of the material hoppers respectively at the end of the valve casing and it is to be noted that the support of the end pipes 40 and 42 relative to the furnace is guaranteed by an overall support structure (not represented). The bellow section 44 is formed by a series of folds allowing relative movement between the inlet and outlet end pipes 40, 42. According to the present invention, a non-structural flexible liner 60 is arranged on an inner wall 62 of the bellow compensator 26 and extends over at least some of the length of said bellow section 44. The non-structural flexible liner 60 has a first end 64 fixedly connected to the inlet end pipe 40 by means of bolts 65 and a second end 66 fixedly connected to the outlet end pipe 42 by means of bolts 67. The non-structural flexible liner 60 construction is adapted to let the hopper, to which it is connected, freely move relative to the valve casing, i.e. it shall absorb ideally no energy from this relative movement in order to avoid unnecessary mechanical constrains and consequently avoid wear and potentially cracks or breakage.

The non-structural flexible liner 60 is dustproof in order to avoid dust passing therethrough and reaching the pockets of the bellow section and is thus itself either made from a dustproof material or comprises a dustproof coating.

The non-structural flexible liner 60 is for example a wire mesh gasket which may comprise three layers of silicone and three layers of a para-aramid synthetic fiber such as Kevlar®. Such a non-structural flexible liner 60 has a thickness of about 5 mm and provides a gas-tight and dust-tight solution to prevent gas and dust from entering the inner pockets of the bellow section 44. Such a non-structural flexible liner 60 tolerates pressures up to 3 bar and temperatures of up to 200° C.—momentarily even up to 400° C. With up to 20 pressure relieves per hour, each being associated with a pressure difference of up to 3 bar, such a flexible liner 60 can have a lifetime of about 5 years.

The non-structural flexible liner 60 is arranged so as to rest on the inner-facing folds 68, or convolutions, of the bellow section 44. As pressure increases in the bellow compensator, the non-structural flexible liner 60 is pushed against the inner-facing folds 68, the latter limiting the movement of the flexible liner 60.

Figure 4:
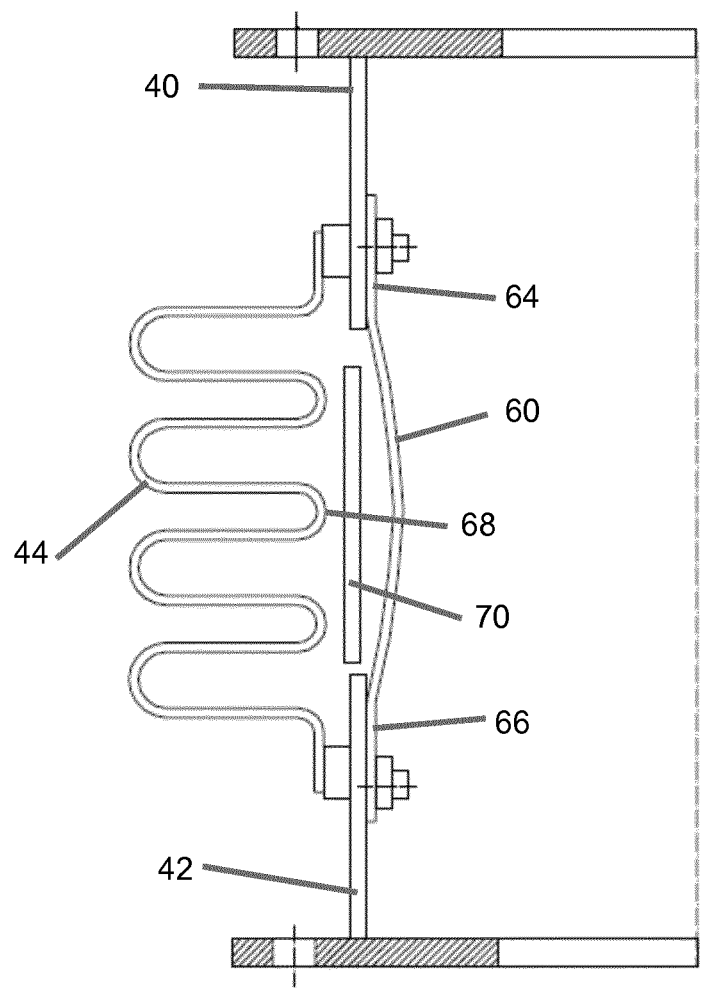
FIG. 4 is a cross-sectional view through a portion of a bellow compensator according to a second embodiment of the present invention.

A portion of a bellow compensator according to a second embodiment of the present invention is shown in FIG. 4. As this bellow compensator is very similar to the one shown in FIG. 3, not all features are described for the sake of conciseness. According to this embodiment, a supporting plate 70 is arranged between the non-structural flexible liner 60 and the inner-facing folds 68 of the bellow section 44. Such a supporting plate 70 may extend over some or all of the height of the bellow section 44.

Figure 5:
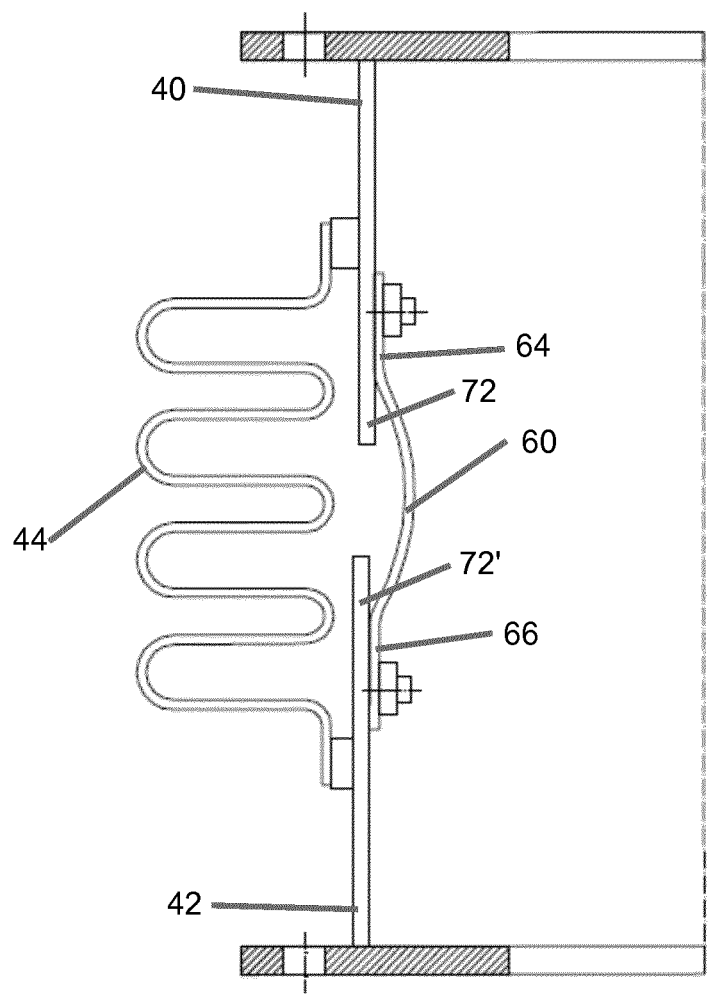
FIG. 5 is a cross-sectional view through a portion of a bellow compensator according to a third embodiment of the present invention.

A portion of a bellow compensator according to a third embodiment of the present invention is shown in FIG. 5. As this bellow compensator is very similar to the one shown in FIG. 3, not all features are described for the sake of conciseness. According to this embodiment, both the inlet and outlet end pipes 40, 42 comprise an extension 72, 72' extending the length of the inlet and outlet end pipes 40, 42, thereby reducing the gap between the inlet and outlet end pipes 40, 42.

The invention claimed is:

1. A bellow compensator for a charging installation of a metallurgical furnace, said bellow compensator comprising:
    an inlet end pipe;
    an opposite outlet end pipe;
    a bellow section arranged between said inlet end pipe and said outlet end pipe, said bellow section being formed by a series of folds and configured to allow relative movement between said inlet end pipe and said outlet end pipe; and
    a non-structural flexible liner arranged on an inner wall of said bellow compensator and extending over at least some of a length of said bellow section,
    wherein the non-structural flexible liner has a first end and a second end, wherein said first end is fixedly connected directly to said inlet end pipe and said second end is fixedly connected directly to said outlet end pipe; and
    wherein said non-structural flexible liner is formed by a wire mesh gasket and comprises at least one layer made from silicone and at least one layer made from synthetic fiber.

2. The bellow compensator according to claim 1, wherein said non-structural flexible liner comprises at least three layers made from silicone and at least three layers made from synthetic fiber.

3. The bellow compensator according to claim 1, wherein said synthetic fiber is para-aramid synthetic fiber.

4. The bellow compensator according to claim 1, wherein said non-structural flexible liner is made from a dustproof material or comprises a dustproof coating.

5. The bellow compensator according to claim 1, wherein said non-structural flexible liner is formed by a flexible material, reinforced or unreinforced.

6. The bellow compensator according to claim 1, wherein said non-structural flexible liner is fixedly connected to the inlet and/or outlet end pipe by welding, bolts, clamps or glue.

7. The bellow compensator according to claim 1, wherein said non-structural flexible liner is supported by inner-facing folds of said bellow section.

8. The bellow compensator according to claim 1, wherein said non-structural flexible liner is supported by a supporting plate arranged between said non-structural flexible liner and said folds of said bellow section.

9. The bellow compensator according to claim 1, wherein at least one of said inlet end pipe and said outlet end pipe comprises an extension extending in direction of the opposite end pipe.

* * * * *